US012797888B2

(12) United States Patent
Christensen et al.

(10) Patent No.: US 12,797,888 B2
(45) Date of Patent: Nov. 17, 2026

(54) HOT MELT COOLING APPARATUS AND METHOD OF USE

(71) Applicant: Oceaneering International, Inc., Houston, TX (US)

(72) Inventors: Marc Christensen, Friendswood, TX (US); William Claude Robertson, Houston, TX (US); Richard Eugene Shafer, Webster, TX (US)

(73) Assignee: Oceaneering International, Inc., Houston, TX (US)

( * ) Notice: Subject to any disclaimer, the term of this patent is extended or adjusted under 35 U.S.C. 154(b) by 351 days.

(21) Appl. No.: 18/477,177

(22) Filed: Sep. 28, 2023

(65) Prior Publication Data

US 2025/0108401 A1 Apr. 3, 2025

(51) Int. Cl.

*B05C 5/00* (2006.01)
*B64G 99/00* (2009.01)
*C09J 5/06* (2006.01)

(52) U.S. Cl.

CPC .............. *B05C 5/001* (2013.01); *B64G 99/00* (2022.08); *C09J 5/06* (2013.01)

(58) Field of Classification Search

None
See application file for complete search history.

(56) References Cited

U.S. PATENT DOCUMENTS 4,488,335 A * 12/1984 Fox ....................... F16B 47/003 24/304
5,793,024 A * 8/1998 Matsen ................... B29C 65/32 219/645
5,892,314 A * 4/1999 Sager ...................... F04B 43/04 310/317
6,690,763 B2 * 2/2004 Nienaber ............... G01N 23/20 378/81
2010/0320187 A1 * 12/2010 Griffin ............... H05K 7/20509 361/705
2013/0078610 A1 * 3/2013 Kimball .................... B01L 7/52 435/286.1
2018/0333910 A1 * 11/2018 Bacallao ............... B29C 64/209
2018/0348731 A1 * 12/2018 Blum ....................... E04D 15/04
2019/0016060 A1 * 1/2019 Christensen ........ B32B 37/0046
2020/0398498 A1 * 12/2020 Christensen ........ B29C 65/4815
2021/0098415 A1 * 4/2021 Lee ......................... B29C 65/30

* cited by examiner

*Primary Examiner* — Carson Gross
*Assistant Examiner* — Abhishek A Patwardhan
(74) *Attorney, Agent, or Firm* — Maze IP Law, P.C.

(57) ABSTRACT

A hot melt device system comprising a hot melt device which comprises a hot melt device, comprising a cooler, a cooler actuator operatively in communication with the cooler, a movable cooler extender operatively in contact with the movable cooler actuator, a hot plate, and a heater operatively in communication with the hot plate, and a thermoplastic adhesive cooler operatively in contact with the hot plate may be used to secure to a target by bringing the thermoplastic adhesive into physical contact with a target; energizing the heater to at least partially liquify the thermoplastic adhesive; bringing the at least partially liquified thermoplastic adhesive into contact with a surface of the target; and allowing the at least partially liquified thermoplastic adhesive to bond to the contacted surface while remaining connected to the contacted surface while allowing the at least partially liquified thermoplastic adhesive to cool to a temperature that is below the thermoplastic adhesive's melting temperature.

11 Claims, 12 Drawing Sheets

StickSat Attached to Satellite

StickSat Robotic Arm Deployed to then Position Payloads

Hot Melt Tech Payloads and Common Attachment Pads are Deployed Around Satellite

HOT MELT COOLING APPARATUS AND METHOD OF USE

RELATION TO OTHER APPLICATIONS

This application claims priority through U.S. Provisional Application 63/410,694 filed on Sep. 28, 2022.

BACKGROUND

In order for adequate bond strength to be achieved with the target surface and the thermoplastic adhesive, contact must be made when the thermoplastic is a liquid and then maintained while the thermoplastic material cools on the target. This cooling time, for the adhesive to solidify, can nominally take more than a minute if the target is a non-thermally conductive material. This cooling time, for the adhesive to solidify, can take too long for some applications if the target's position is not fixed and it can move away from the apparatus when initially contacted. For some hot melt apparatus applications, where resources (such as electrical energy and fuel) are being expended to maintain apparatus and/or target positions during the time needed for effective adhesive bonding, a means to reduce this time is needed. For some hot melt apparatus applications, a contact compliance mechanism is also needed to allow a moving target to remain in close contact with the apparatus while the adhesive has time to cool and create adequate bond strength.

A means is also needed to attach smaller spacecraft to multiple surfaces and areas of larger spacecraft or in-space host objects. The host object can then be further modified once the smaller spacecraft attaches to the host using hot melt.

FIGURES

Various figures are included herein which illustrate aspects of embodiments of the disclosed inventions.

DESCRIPTION OF EXEMPLARY EMBODIMENTS

As used herein "hot melt" is a thermoplastic adhesive material which can adhere to contacted surfaces when in a liquid state and then adherence remains when cooled to a solid at temperatures below is softening point. As used herein, a "target" is a relatively stationary or dynamically moving object to which a hot melt device or a hot melt apparatus equipped device needs to attach.

Figure 1:
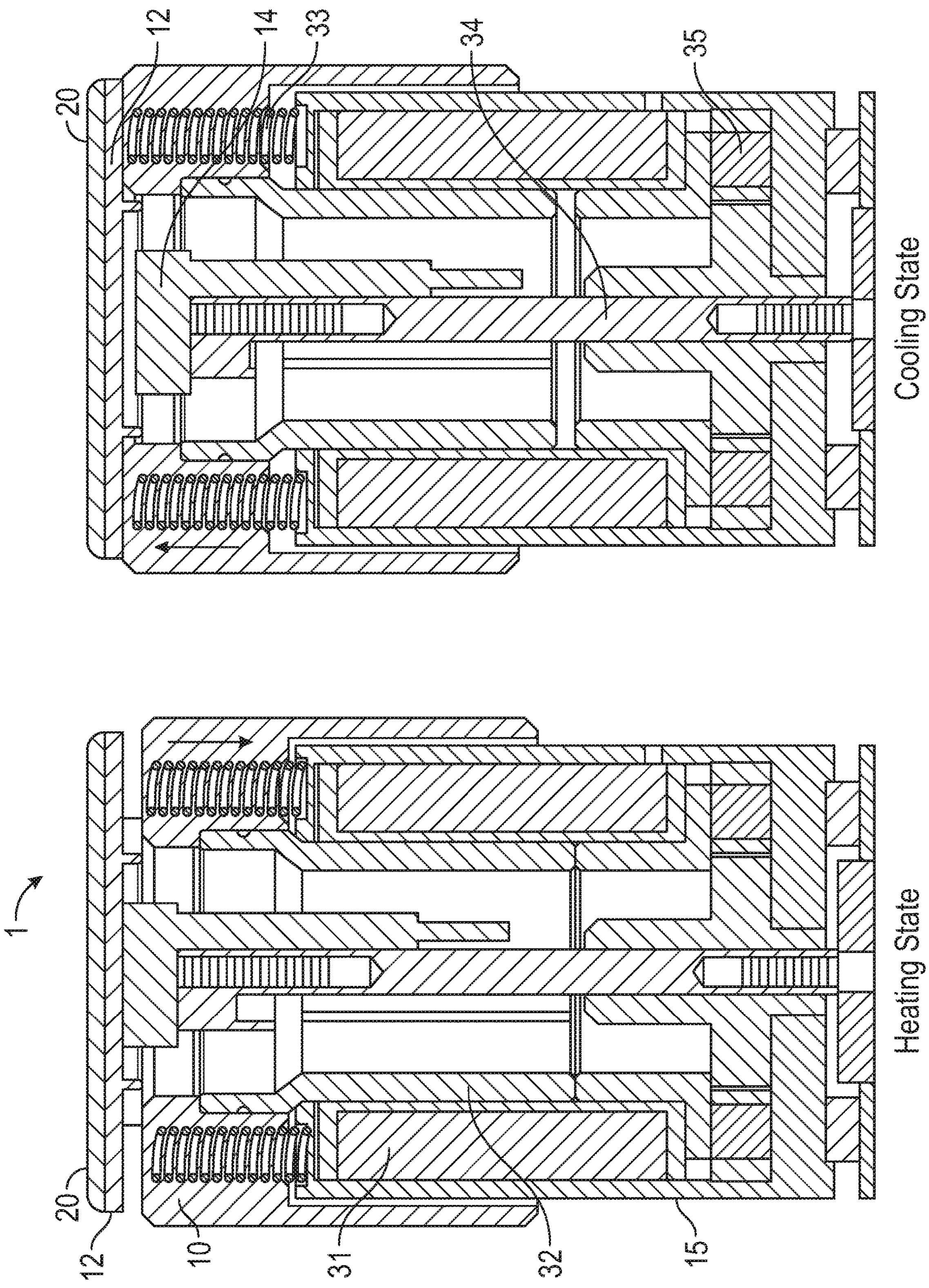
FIG. 1 is a cutaway view in partial perspective of an exemplary embodiment of a hot melt device, which has a heat sink that contacts an internal side of the heater plate to rapidly cool it.
Figure 2:
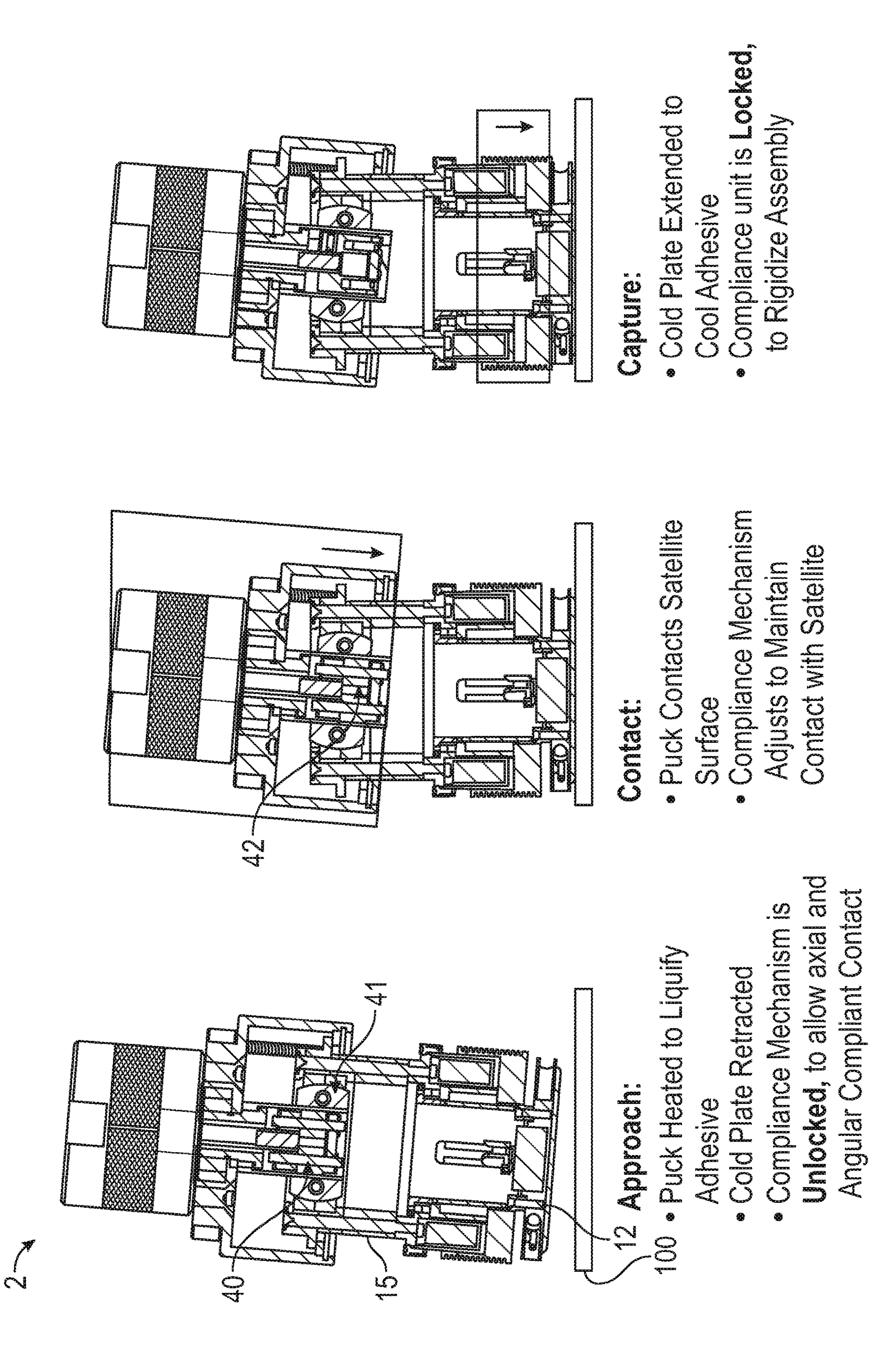
FIG. 2 is a schematic view of a further exemplary embodiment of a hot melt device system with an (axial) extension arm and a (angular) compliance mechanism with various positions of a compliance mechanisms illustrated.

In a first embodiment, referring generally to FIG. 1, hot melt device 1 comprises cooler 10,18 (FIG. 3); cooler actuator 31 operatively in communication with cooler 10,18; hot plate 12 typically disposed intermediate heater 15 and thermoplastic adhesive 20, hot plate 12 adapted to contact thermoplastic adhesive 20; movable cooler extender (generally referred to as "30" which is not shown in the figures but which is explained below) which can be commanded to cause cooler 10,18 to contact hot plate 12; and heater 14 operatively in communication with hot plate 12.

In a first embodiment, cooler 10, 18 comprises heat sink 10 disposed proximate a backside of hot plate 12 and contacts the backside of hot plate 12 to cool hot plate 12 and indirectly cool thermoplastic adhesive 20. In this embodiment, hot plate 12 is typically in direct contact with thermoplastic adhesive 20. In other embodiments, cooler 10,18 comprises barbed heat sink 18 (FIG. 3) and hot plate 12 disposed proximate thermoplastic adhesive 20. In this embodiment, heat sink 18 comprises a predetermined set of barbs and hot plate 12 (FIG. 3) comprises a predetermined set of channels, e.g., holes, corresponding to the predetermined set of barbs through which the predetermined set of barbs can be advanced, e.g., pushed, into at least partially into thermoplastic adhesive 20 to effect cooling of thermoplastic adhesive 20. In a third embodiment, no cooler 10,18 is required and evaporation cooling occurs around heat plate 12 or thermoplastic adhesive 20.

In embodiments, cooler extender 30 comprises one or more cooler extension solenoid coils 31; one or more cooler extension solenoid armatures 32 typically operatively disposed within at least one cooler extension solenoid coil 31; one or more springs 33 operatively disposed between at least one cooler extension solenoid armature 31 and hot plate 12, e.g., hot plate 12; at least one heater push rod 34 typically disposed within at least one cooler extension solenoid coil 31 and operatively in communication with hot plate 12, e.g., hot plate 12; and one or more magnets 35 disposed proximate at least one cooler extension solenoid coil 31.

Cooler extension 30 may comprise one or more trip rods 36 (FIG. 3) operatively slidingly connected to a housing, e.g., housing 15, and hot plate 12 and motor 37 (FIG. 3) operatively in communication with cooler 10,18.

In embodiments, hot melt device 1 may further comprise a target position sensor or detector to create a trigger which, in embodiments can act as a hair trigger, e.g., a mechanical, electrooptical, electromagnetic, and/or an optical trigger, which may be used to activate and/or deactivate heater 14 and active rapid hot melt cooling, e.g., turn power off and on to heater 14.

In certain embodiments, hot melt device 1 further comprises an additional thermal conductor or cooler 10,18 disposed adjacent to heater 14 and thermoplastic adhesive 20 which, when activated, causes rapid cooling of thermoplastic adhesive 20 to occur.

Figure 4:
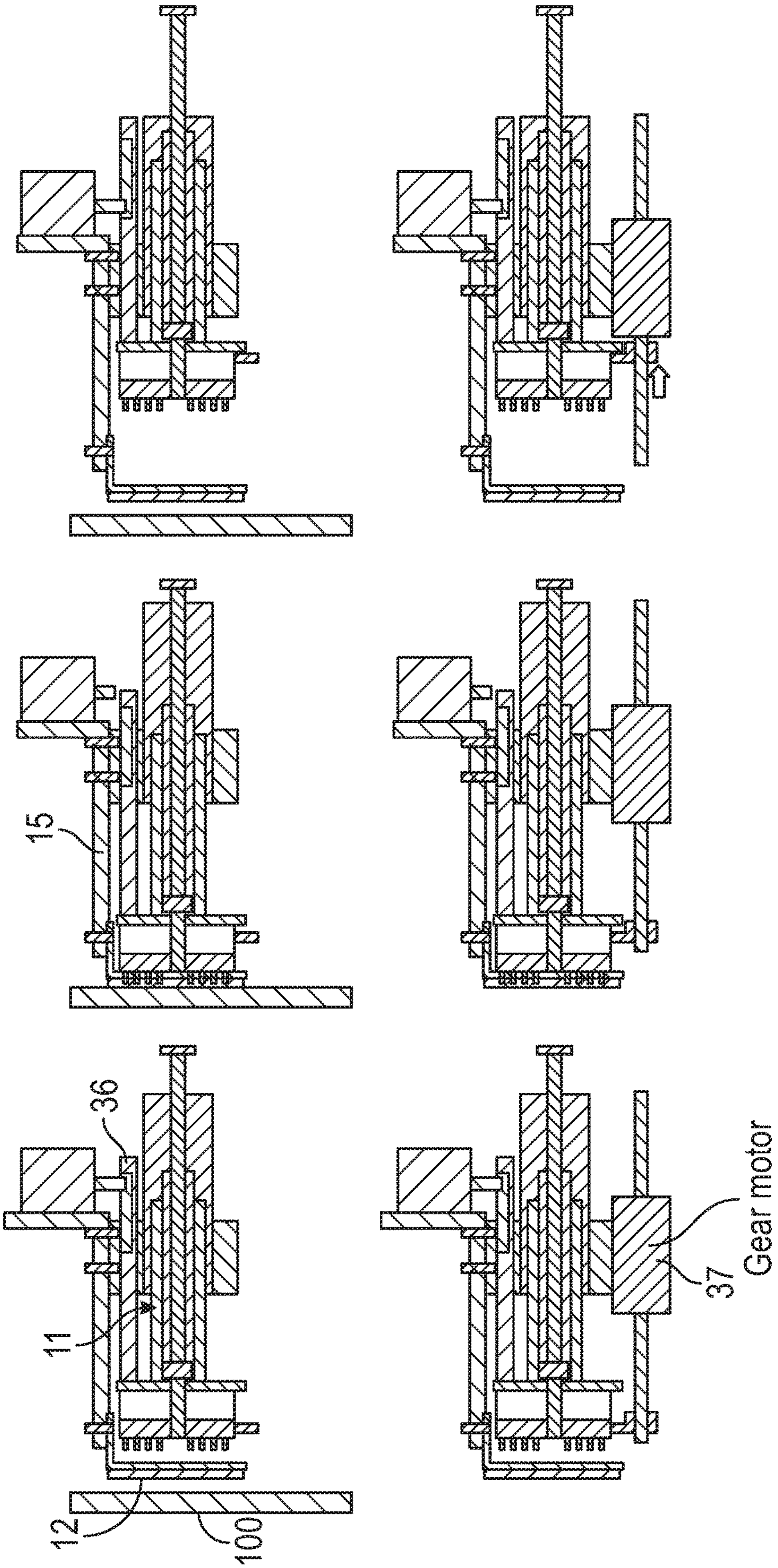
FIG. 4 is a schematic view of a further exemplary embodiment of a hot melt device.

In embodiments, hot melt device 1 components such as thermoplastic adhesive 20 and hot plate 12 can be detached from the rest of hot melt device 1 and left on target 100 (FIG. 4).

In certain embodiments, thermoplastic adhesive 20 is replaceable and/or refurbishable. For example, thermoplastic adhesive 20 may comprise a replaceable thermoplastic adhesive pad.

In certain embodiments, heater 14 comprises a plurality of heater elements.

In certain embodiments, hot melt device 1 comprises a mechanism (such as a linear actuator) that pushes on target 100 and pries thermoplastic adhesive 20, and thus hot melt device 1, off a surface of target 100 for separation of hot melt device 1 from target 100.

In certain embodiments, hot melt device 1 further comprises a thermoelectric cooler, such as a peltier cooler, connected to cooler 10,18 which pre-cools cooler 10,18 prior to the rapid cooling of thermoplastic adhesive 20.

Figure 5:
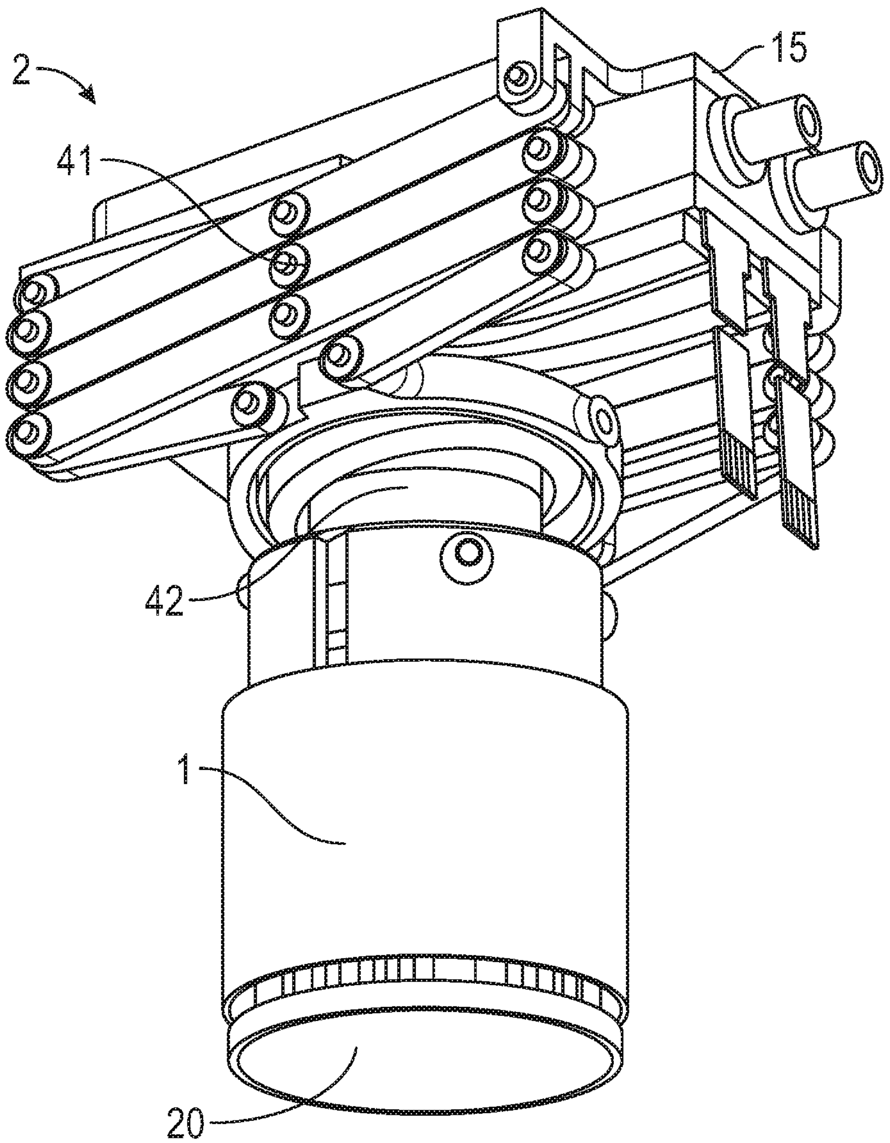
FIG. 5 is a schematic view of a further exemplary embodiment of a hot melt device with an (axial) extension arm scissor mechanism and (angular) compliance mechanism in a retracted position.

Referring now to FIG. 5, hot melt system 2 may use hot melt device 1, which is as described above and lockable compliance adjuster, generally referred to as "40" and detailed herein below. Lockable compliance adjuster 40 is generally operative to adjust a multi-dimensional position of hot melt device 1 relative to an object, e.g., target 100 (FIG. 4), such as but not limited to in an axial and/or an angular offset. In embodiments, a selectively extendable and retractable compliance mechanism 40 is operatively connected to housing 15 and connectable or movable to connect hot melt device 1 to a target 100 to extend a contact time between hot melt device 1 and target 100. Selectively extendable and retractable compliance mechanism 40, when extended, may be useful to prevent a touched target 100 from reactively moving away from hot melt device 1.

Figure 6:
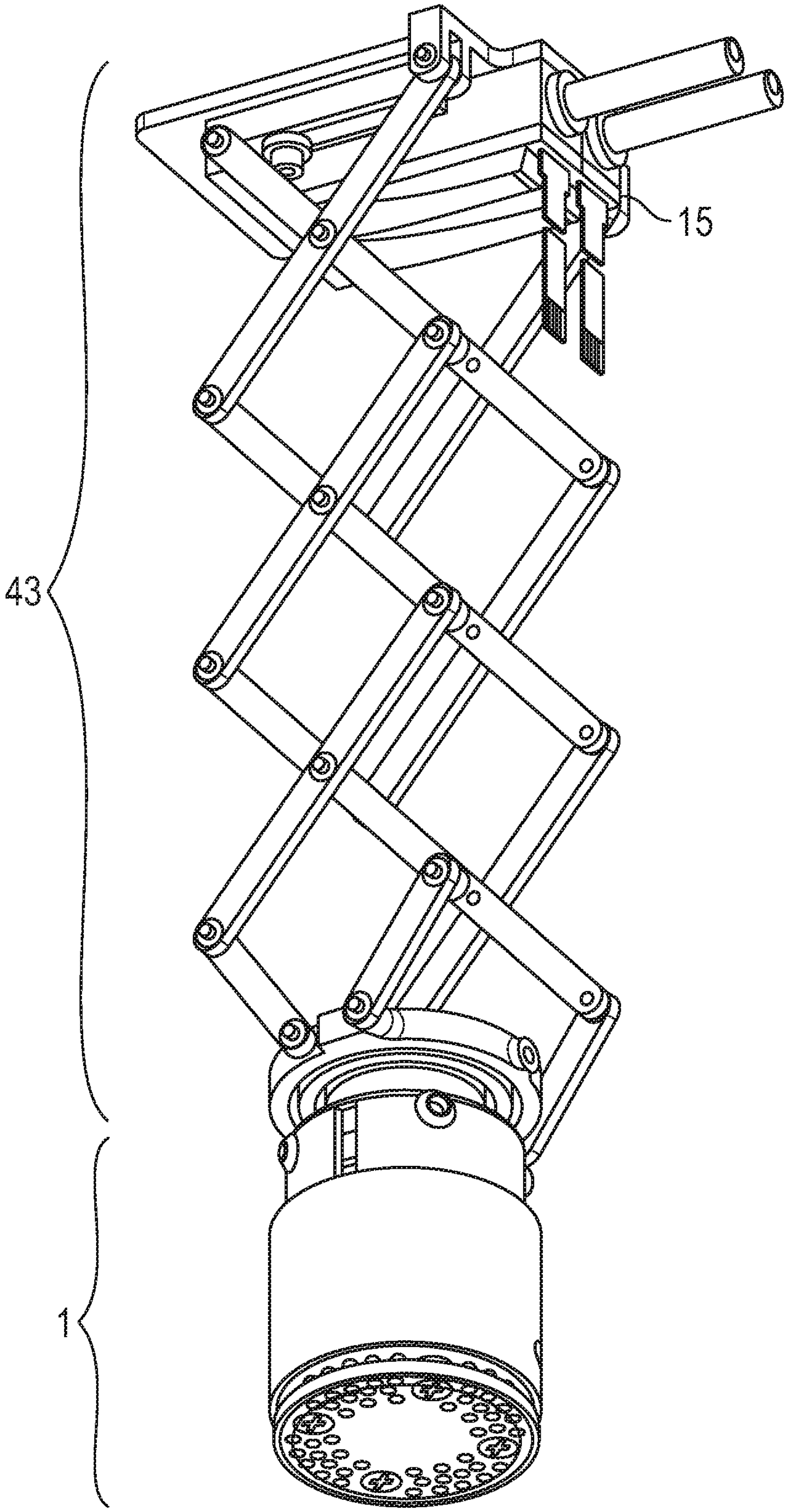
FIG. 6 is a schematic view of a further exemplary embodiment of a hot melt device shown in FIG. 5 but in an extended position.
Figure 7:
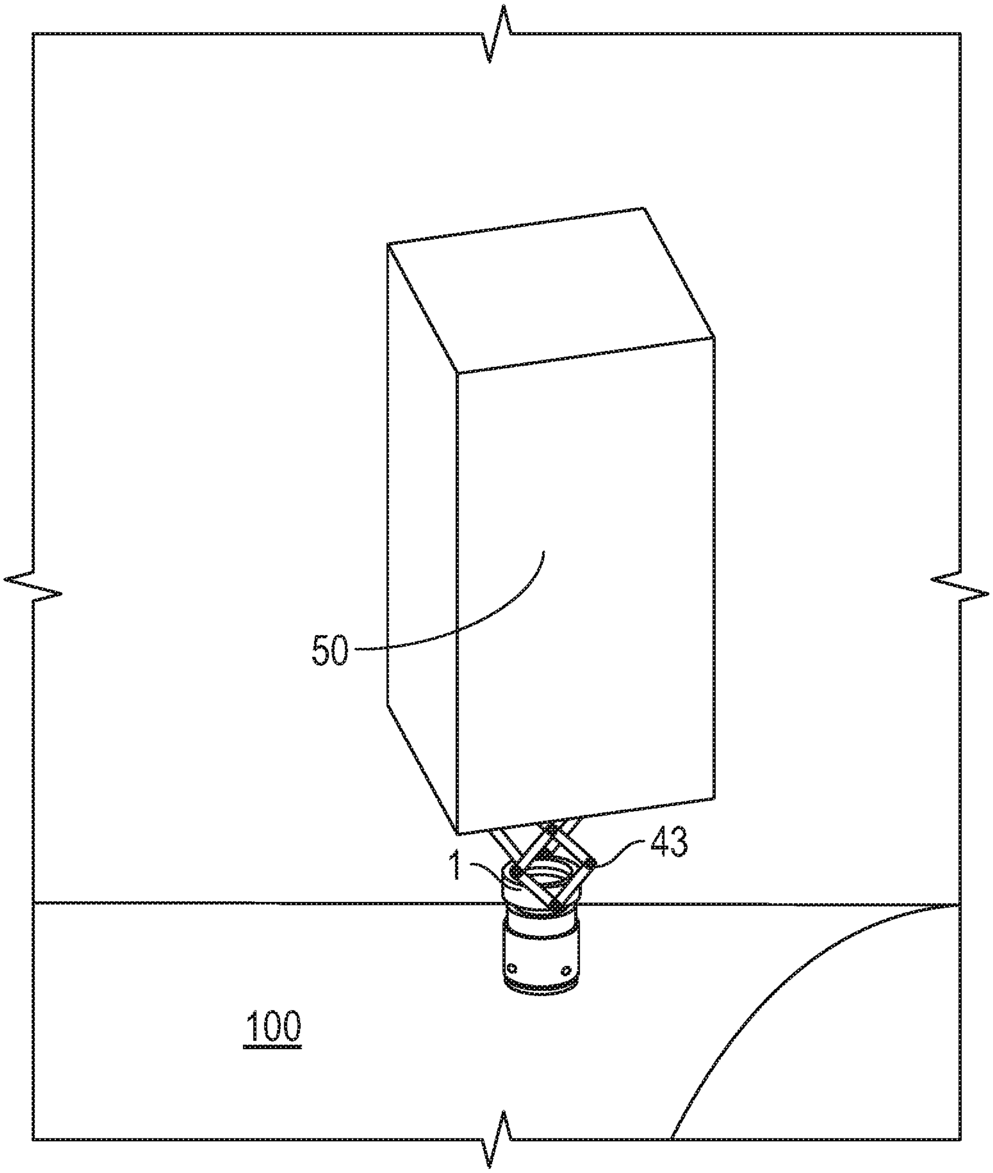
FIG. 7 is an illustration of a further embodiment of the device shown in FIG. 6 attached to a target or host

In embodiments, selectively extendable and retractable compliance mechanism 40 comprises axial compliance mechanism 41 (FIG. 4; FIG. 5) and/or yaw and pitch compliance mechanism 42. Selectively extendable and retractable compliance mechanism may comprise selectively expandable arm 43 (FIG. 6) and retractable arm 41 (FIG. 5) which may be configured as a scissor-jack arm.

Figure 3:
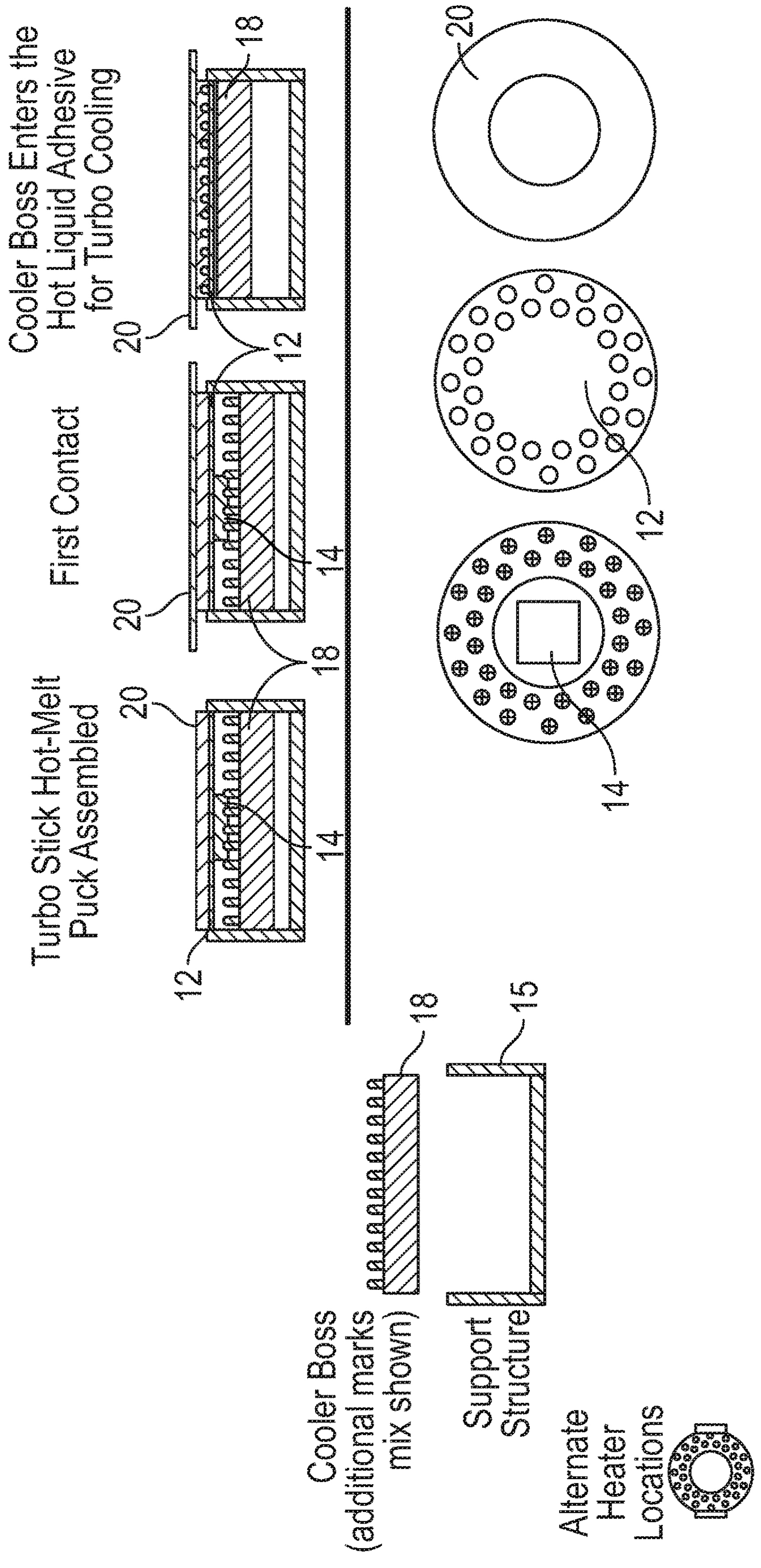
FIG. 3 is a schematic view of an exemplary hot melt device with a barbed heat sink, which has a heat sink that penetrates melted thermoplastic adhesive to rapidly cool it.
Figure 9:
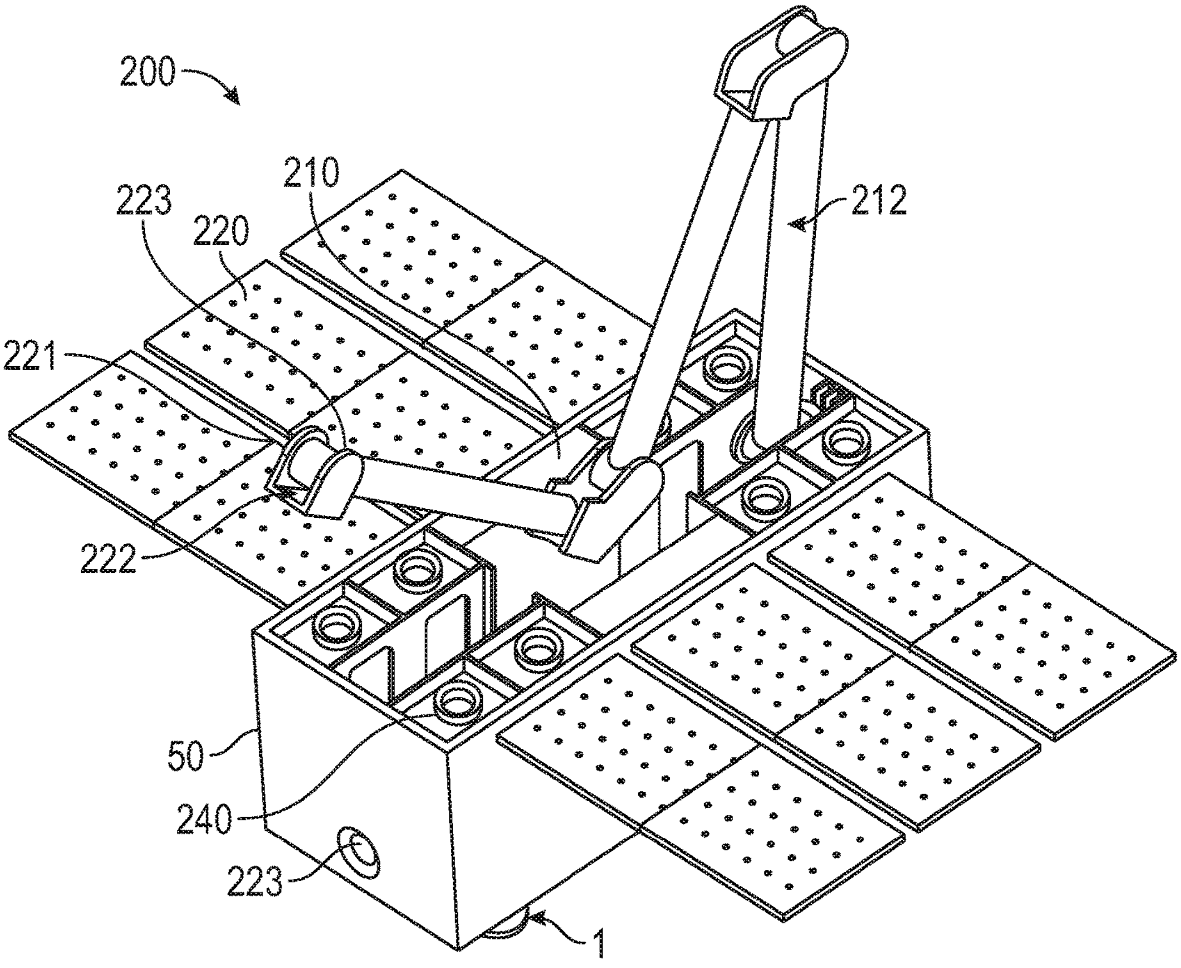
FIG. 9 is an illustration of the further embodiment of a "sticksat" satellite or in-space object that attaches to a host satellite or in-space object using one or more Hot Melt pads.

Referring to FIG. 9, in a further contemplated embodiment hot melt microsat system 200 comprises microsat housing 50; hot melt device 1, as described above, disposed at least partially within microsat housing 50; thermoplastic adhesive 20 (FIG. 1), operatively in contact with hot plate 12 (FIG. 1; FIG. 3) and typically in direct contact with cooler 10,18 (FIG. 1), exposed to an exterior of microsat housing 50; a predetermined set of electronics 210 (FIG. 9) disposed at least partially within microsat housing 50; selectively extendable and retractable compliance arm 212 (FIG. 9) operatively connected to hot melt device housing 15 (FIG. 1) or a mounting structure and operatively in communication with the predetermined set of electronics 210; power supply 220 (FIG. 9) operatively in communication with predetermined set of electronics 210, hot melt device 1, and selectively extendable and retractable compliance arm 212; and propulsion system 230 (FIG. 9) operatively in communication with microsat housing 50. As used herein "microsat" is typically a self-propelled satellite or detachable in-space object or payload.

Power supply 220 may comprise a predetermined set of deployable solar panels.

Selectively extendable and retractable compliance arm 212 may comprise a deployable robotic arm. In these embodiments, electromechanical interface 223 may be disposed at a furthest end of selectively extendable and retractable compliance arm 221 and one or more cameras 222 disposed at a furthest end of selectively extendable and retractable compliance arm 212 where camera 222 is operatively in communication with predetermined set of electronics 210.

Figure 10:
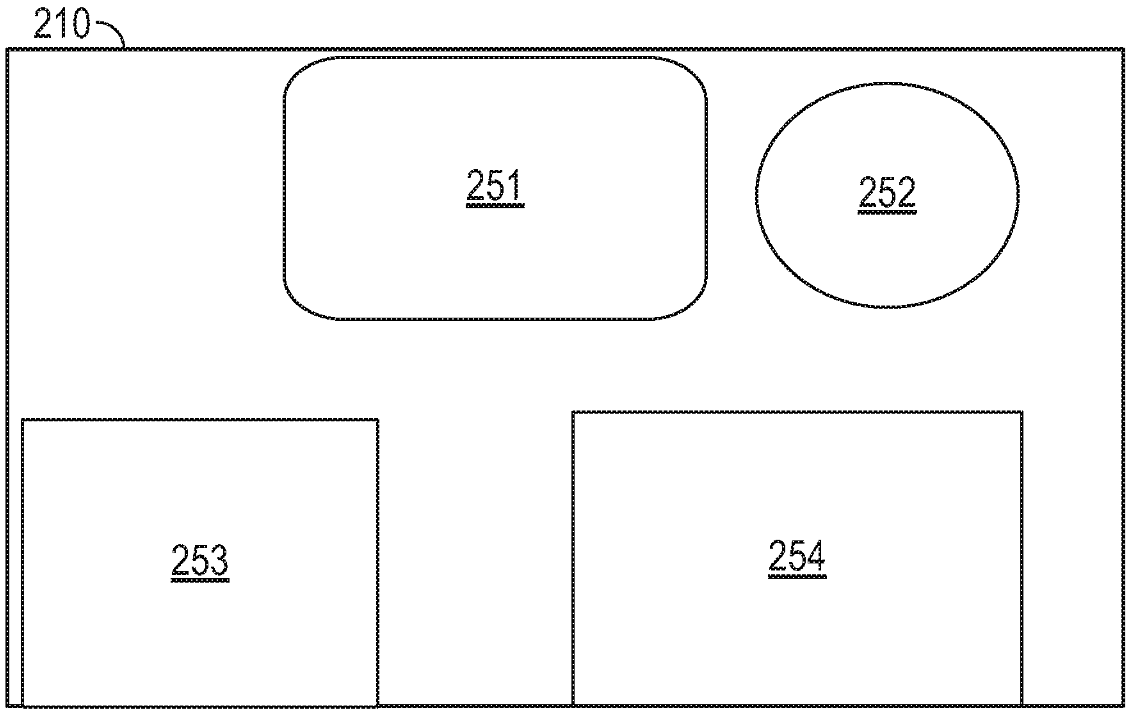
FIG. 10 is a block diagram of a predetermined set of electronics.
Figure 11:
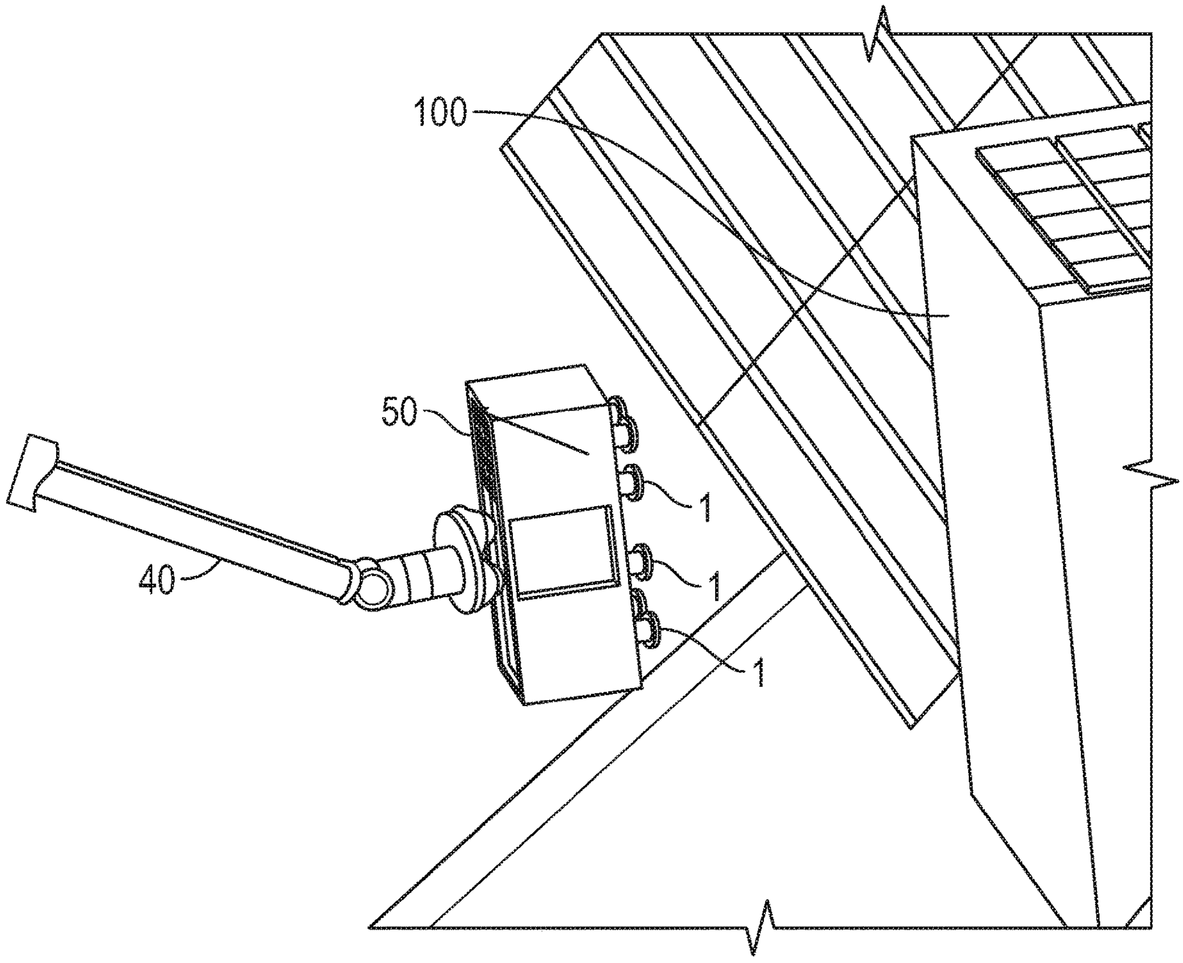
FIG. 11 is a further illustration of the further embodiment of a "sticksat" satellite or in-space object placed by a robotic arm.
Figure 12:
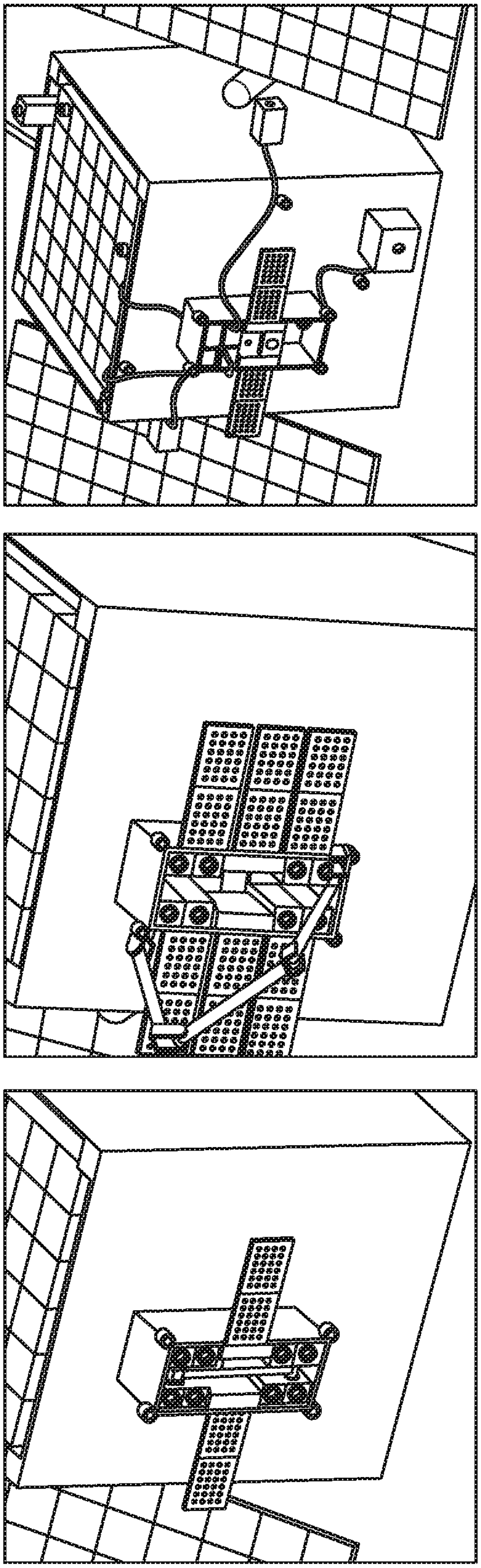
FIG. 12 is an illustration of a self propelled system with a built-in robotic arm.

Referring to FIG. 10, predetermined set of electronics 210 may comprise power system 251 operatively in communication with power supply 220; data communicator 252; predetermined set of avionics 253; and deployable optical, electronic, and mechanical package 254.

In the operation of exemplary methods, referring back to FIG. 1 and generally to FIGS. 2-8, heater 14 and hot plate 12 are used to heat thermoplastic adhesive 20 to an at least partially liquified state before thermoplastic adhesive 20 contacts target 100 (FIG. 4). Around the time thermoplastic adhesive 20 contacts target 100, power to heater 14 is removed or otherwise disabled. A cooling mechanism, i.e., cooler 10,18 (FIG. 1; FIG. 3), is placed into contact with or pushed through hot plate 12 to contact thermoplastic adhesive 20, directly or indirectly. The cooling mechanism is then used to promote cooling of the at least partially liquified thermoplastic adhesive 20 and, in embodiments, of hot plate 12.

Also around the time thermoplastic adhesive 20 contacts target 100, if present compliance mechanism 40 (FIG. 5) restracts or expands to allow hot melt device 1 and surfaces of contacted target 100 to remain in contact long enough for thermoplastic adhesive 20 to set. Generally, this allows thermoplastic adhesive 20 to immediately start to adhere to target 100 and cool upon contact with target 100. Upon cooling, hot melt device 1 may remain fixed indefinitely.

Hot melt device system 2 (FIG. 4), which is as described above, may be used by bringing thermoplastic adhesive 20 into physical contact with target 100; at a predetermined time prior to when thermoplastic adhesive 20 contacts target 100, heater 14 is energized to at least partially liquify thermoplastic adhesive 20 which is then brought into contact with a surface of target 100; cooler 10,18 (FIG. 1; FIG. 3) is typically activated, e.g., pushed into contact with liquified thermoplastic adhesive 20 or into contact with hot plate 12, and used to cool liquified thermoplastic adhesive 20 directly or indirectly to more quickly bond to the contacted surface while remaining connected to the contacted surface by allowing liquified thermoplastic adhesive 20 to cool to a temperature that is below the melting temperature of liquified thermoplastic adhesive 20. Allowing liquified thermoplastic adhesive 20 to cool to a temperature that is below the melting temperature may comprise removing power to heater 14 to allow it and allowing liquified thermoplastic adhesive 20 to cool after pushing cooler 10,18 into contact with liquified thermoplastic adhesive 20.

In embodiments, cooler 10,18 involves the release of liquid or gas (such as $H_2O$) for evaporation cooling around heat plate 12 or thermoplastic adhesive 20.

In embodiments where cooler 10,18 comprises barbed heat sink 18 (FIG. 3), barbed heat sink 18 is typically pushed into liquified thermoplastic adhesive 20 after liquified thermoplastic adhesive 20 is in contact with the surface of target 100 (FIG. 4). In these embodiments, rapid cooling typically occurs after having barbed sink 18 penetrate thermoplastic adhesive 20 from a side opposite target 100. Rapid cooling also typically occurs from rapid evaporation around heater 14 and thermoplastic adhesive 20.

Figure 8:
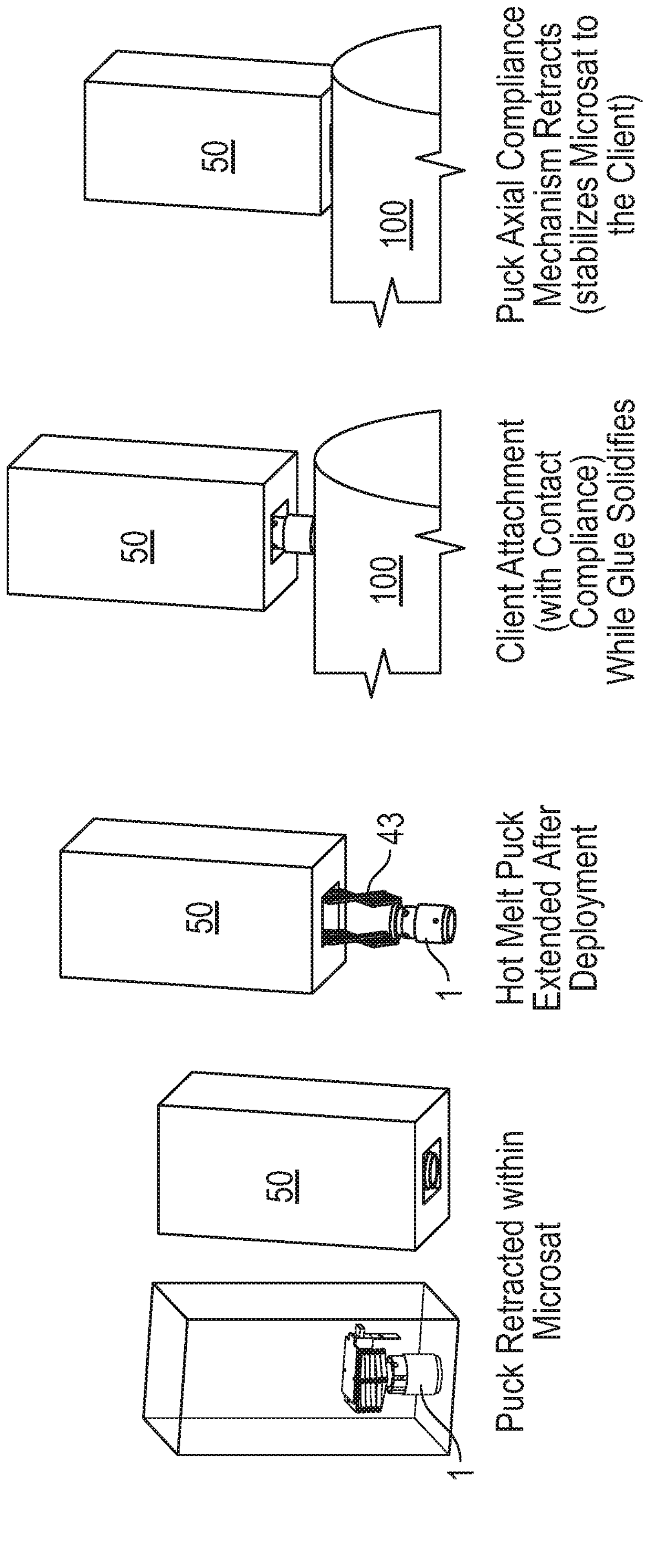
FIG. 8 is a set of illustrations of the further embodiment of the device shown in FIG. 7 with various positions of the compliance mechanisms illustrated.

Referring additionally to FIG. 8, where compliance mechanism 40 (FIG. 4; FIG. 5) is present it may be used to extend contact time between hot melt device 1 and target 100. In these embodiments, compliance mechanism 40 may be unlocked prior to approaching target 100 to allow axial and/or angular compliant contact between hot melt device 1 and target 100 to extend the time that the liquified thermoplastic adhesive 20 contacts the surface of target 100. Compliance mechanism 40 may also be used to adjust a desired relative position between hot melt device 1 and the surface of target 100 to allow hot melt device 1 and the surface of target 100 to remain in contact long enough for cooled thermoplastic adhesive 20 to set. Hot melt device 1 may then be used to prevent target 100 from reactively moving away by locking compliance mechanism 40 into a position relative to target 100. Once contact and compliance are achieved and relative dynamic movement stops, compliance mechanism 40 can be deactivated, e.g., a compliance solenoid turned off. Compliance mechanism 40 may then be locked in whatever state it is in to prevent further movement or compliance due to any movement changes of target 100 and create a needed rigid attachment of hot melt device 1 equipped into a payload to target 100. As illustrated in FIG. 8, this procedure may apply where hot melt device 1 is part of or otherwise integrated into microsat 80.

Where it is present, compliance mechanism 40 may be automatically or manually triggered and may be configured to allow heated thermoplastic adhesive 20 more time to bond to the contacted surface while remaining connected to the contacted surface.

In embodiments, a command may be issued to a connected hot melt device 1 to reset hot melt device 1 for attaching to another target 100. This may be done, in part, by issuing a command to reheat hot plate 12 of hot melt device 1 to release hot melt device 1 from a captured target 100.

Hot melt device 1 may be used to attach to and thereby grab in-space targets 100, such as debris, even where target 100 comprises an irregular shape, e.g., flat, curved, rough, or multilevel surfaces.

If hot melt device 1 is incorporated into a payload, hot melt device 1 may be attached to a target's surface at any orientation including manmade and natural structures.

When part of hot melt system 2 (FIG. 4), holt melt device 1 may be attached to an exposed surface of target 100 by heating thermoplastic adhesive 20 before it comes into contact with a contact target 100; allowing thermoplastic adhesive 20 to adhere to that contact target 100 and then to cool upon contact with target 100; and, upon cooling to a predetermined temperature, allowing thermoplastic adhesive 20 to remain fixed to the target contact. If so desired, thermoplastic adhesive 20 may be removed from target 100 through reheating or by applying a peel-off force. In embodiments, multiple attachments and detachments can be achieved without needing to replenish thermoplastic adhesive 20.

In some embodiments, axial compliance mechanism 43 can be used to lower microsat housing 50 onto target 100 (FIG. 8) to further secure a microsat to target 100.

In most embodiments, thermoplastic adhesive 20 is solvent free and the process does not require a chemical reaction to achieve adhesion, nor is adhesion affected by a vacuum. Moreover, target 100 may comprise thermally conductive and non-thermally conductive surfaces against which adhesion can take place, with near-instant adhesion to thermally conductive surfaces such as metal and glass. In addition, no contact force is typically required and hot melt device 1 may accommodate high contact force.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A hot melt device, comprising:

a) a cooler;

b) a cooler actuator operatively in communication with the cooler;

c) a movable cooler extender operatively in contact with the cooler actuator and operative to advance or retract the cooler within a housing;

d)

e) a heater; and f) a hot plate operatively in communication with the heater and adapted to contact a thermoplastic adhesive, the hot plate selectively in contact with the cooler.

2. The hot melt device of claim 1, wherein:

a) the hot plate is directly in contact with a thermoplastic adhesive on a first side of hot plate; and b) the cooler comprises a heat sink cooler operatively in communication with the hot plate on a side opposite the first side of hot plate.

3. The hot melt device of claim 1, wherein:

a) the cooler comprises a barbed heat sink cooler comprising a predetermined set of barbs adapted to penetrate into a thermoplastic adhesive cooler; and b) the hot plate is disposed intermediate the heater and the thermoplastic adhesive cooler and comprises a corresponding set of channels adapted to accept the predetermined set of barbs therethrough.

4. The hot melt device of claim 1, wherein the movable cooler extender further comprises:

a) a cooler extension solenoid coil;

b) a cooler extension solenoid armature cooler operatively disposed within the cooler extension solenoid coil;

c) a spring cooler operatively disposed between the cooler extension solenoid armature and the hot plate;

d) a heater push rod cooler disposed within the cooler extension solenoid coil and operatively in communication with the hot plate; and e) a magnet disposed proximate the cooler extension solenoid coil.

5. The hot melt device of claim 1, wherein the movable cooler extender further comprises:

a) a trip rod operatively slidingly connected to the housing and the hot plate; and b) a motor operatively in communication with the cooler.

6. A hot melt system, comprising:

a) a hot melt device, comprising:

i) a housing;

ii) a cooler;

iii) a cooler actuator disposed at least partially within the housing and operatively in communication with the cooler;

iv) a movable cooler extender disposed at least partially within the housing;

v) a hot plate disposed at least partially within the housing; and vi) a heater disposed at least partially within the housing and operatively in communication with the hot plate;

b) a thermoplastic adhesive cooler operatively in contact with the cooler; and c) a lockable compliance adjuster operative to adjust a multi-dimensional position of the hot melt device relative to an object in an axial and an angular offset.

7. The hot melt device of claim 6, wherein:

a) the hot plate is directly in contact with a thermoplastic adhesive cooler on a first side of hot plate; and b) the cooler comprises a heat sink cooler operatively in communication with the hot plate on a side opposite the first side of hot plate.

8. The hot melt device of claim 6, wherein:

a) the cooler comprises a barbed heat sink cooler comprising a predetermined set of barbs adapted to penetrate into the thermoplastic adhesive cooler; and b) the hot plate is disposed intermediate the heater and the thermoplastic adhesive cooler and comprises a corresponding set of channels adapted to accept the predetermined set of barbs therethrough.

9. The hot melt system of claim 6, wherein the lockable compliance adjuster further comprises a selectively extendable and retractable compliance mechanism operatively connected to the housing and connectable or movable to connect the hot melt device to a target cooler to extend a contact time between the hot melt device and the target.

10. The hot melt system of claim 6, wherein the thermoplastic adhesive cooler is refurbishable.

11. The hot melt system of claim 6, wherein the hot melt device further comprises a thermoelectric cooler connected to the cooler.

* * * * *